(12) United States Patent
Jinno et al.

(10) Patent No.: US 11,366,080 B2
(45) Date of Patent: Jun. 21, 2022

(54) EDDY CURRENT FLAW DETECTION PROBE

(71) Applicant: MITSUBISHI HEAVY INDUSTRIES, LTD., Tokyo (JP)

(72) Inventors: Kentaro Jinno, Tokyo (JP); Masaaki Kurokawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 80 days.

(21) Appl. No.: 16/977,578

(22) PCT Filed: Feb. 22, 2019

(86) PCT No.: PCT/JP2019/006789
§ 371 (c)(1),
(2) Date: Sep. 2, 2020

(87) PCT Pub. No.: WO2019/181363
PCT Pub. Date: Sep. 26, 2019

(65) Prior Publication Data
US 2021/0010974 A1   Jan. 14, 2021

(30) Foreign Application Priority Data
Mar. 19, 2018   (JP) .............................. JP2018-050696

(51) Int. Cl.
*G01N 27/904* (2021.01)

(52) U.S. Cl.
CPC ................................. *G01N 27/904* (2013.01)

(58) Field of Classification Search
None
See application file for complete search history.

(56) References Cited

U.S. PATENT DOCUMENTS

| | | | |
|---|---|---|---|
| 8,421,449 B2* | 4/2013 | Harada | G01N 27/904 324/240 |
| 2011/0050380 A1* | 3/2011 | Nakanishi | H01F 27/341 336/200 |
| 2013/0193960 A1* | 8/2013 | Nishimizu | G01N 27/82 324/240 |
| 2015/0108970 A1 | 4/2015 | Kurokawa et al. | |

FOREIGN PATENT DOCUMENTS

JP   2015-81815 A   4/2015

* cited by examiner

*Primary Examiner* — Nasima Monsur
(74) *Attorney, Agent, or Firm* — WHDA, LLP

(57) ABSTRACT

An eddy current flaw detection probe includes first coils, second coils, and a switching circuit configured to cause the first or the second coils in each unit U, the unit U being composed of adjacent four coils, to serve as excitation coils that generate eddy currents in an inspection target and cause the other coils in the unit U to serve as detection coils that detect a change in the eddy currents. The first coils each have one end thereof connected to a first common wiring, and the second coils each have one end thereof connected to a second common wiring. The switching circuit includes a first switching circuit connected to the other ends of the first coils and the second coils arranged in a first row, and a second switching circuit connected to the other ends of the first coils and the second coils arranged in a second row.

10 Claims, 5 Drawing Sheets

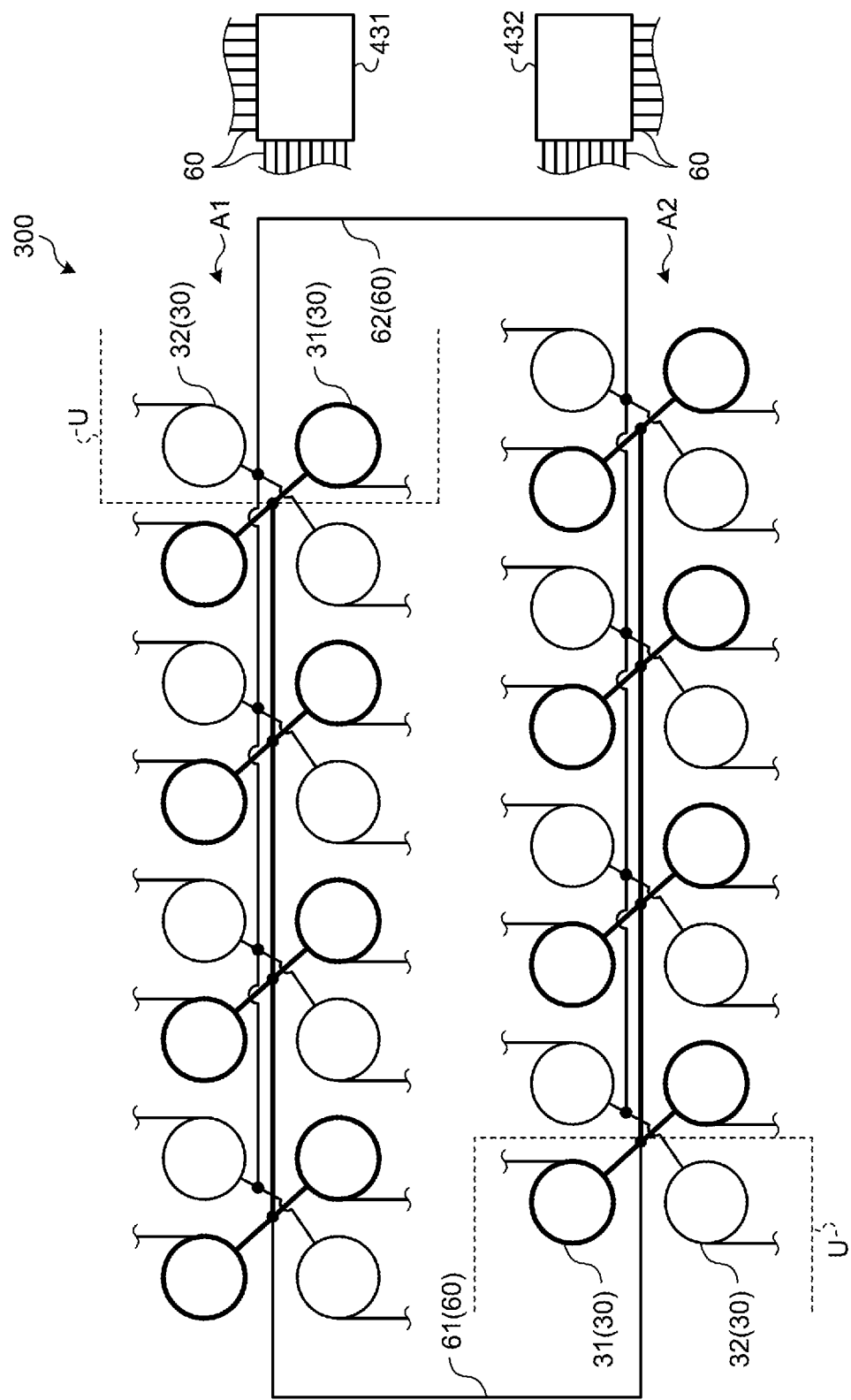

EDDY CURRENT FLAW DETECTION PROBE

CROSS-REFERENCE TO RELATED APPLICATIONS

This application is a national stage of PCT International Application No. PCT/JP2019/006789 filed in Japan on Feb. 22, 2019, which claims priority to and incorporates by reference the entire contents of Japanese Patent Application No. 2018-050696 filed in Japan on Mar. 19, 2018.

FIELD

The present application relates to an eddy current flaw detection probe.

BACKGROUND

Conventionally, techniques have been known regarding an eddy current flaw detection probe that performs a flaw detection inspection on an inspection target by generating eddy currents in the inspection target and detecting a change in the eddy currents. For example, Japanese Laid-open Patent Application No. 2015-081815 discloses an eddy current flaw detection probe including: excitation coils including first excitation coils and second excitation coils with each of the first excitation coils arranged point-symmetrically to the corresponding second excitation coil; and detection coils including first detection coils and second detection coils with each of the first detection coils arranged point-symmetrically to the corresponding second detection coil. In this eddy current flaw detection probe, multiple probe units each having the excitation coils and the detection coils that are arranged in two rows and two columns are lined up in a certain direction. A coil that has functioned for excitation in a preceding flaw detection process is caused to function as a detection coil in the succeeding flaw detection process. A detection coil that has functioned for detection in the proceeding flaw detection process is caused to function as an excitation coil in the succeeding flaw detection process.

SUMMARY

The eddy current flaw detection probe described in Patent Literature 1 mentioned above performs flaw detection processes while switching each coil between states being an excitation coil and being a detection coil. This means that each coil needs to be connected to switching circuits for switching the coil between states functioning for excitation and functioning for detection. In this connection, one and the other ends of each coil arranged in a first row are connected to different switching circuits, and one and the other ends of each coil arranged in a second row are connected to different switching circuits. For this reason, two switching circuits are needed for each row, and two wirings extend from each coil to the switching circuits. Consequently, the number of constituent elements of the eddy current flaw detection probe increases and the wiring structure thereof is complicated, and size reduction and easy manufacturing of the eddy current flaw detection probe may be impeded.

An eddy current flaw detection probe is provided.

According to one aspect, there is provided an eddy current flaw detection probe configured to perform a flaw detection inspection on an inspection target by generating eddy currents in the inspection target and detecting a change in the eddy currents, the eddy current flaw detection probe comprising: multiple pairs of first coils arranged along a certain direction, the first coils of each pair being arranged in two rows; multiple pairs of second coils arranged along the certain direction, the second coils of each pair being arranged in two rows; wherein the second coils in one pair are arranged in a point symmetry in a center line therebetween that intersects a center line of a corresponding pair of the first coils; and a switching circuit configured to cause the first coils or the second coils in each unit to serve as excitation coils that generate the eddy currents in the inspection target and cause the other coils among the first coils and the second coils in the unit to serve as detection coils that detect a change in the eddy currents, the unit being composed of adjacent four of the coils, the four of the coils being arranged in two rows and two columns and composing two of the first coils and two of the second coils, the two of the second coils being arranged in a point symmetry to the two of the first coils, wherein each of the first coils has one end thereof connected to a first common wiring, each of the second coils has one end thereof connected to a second common wiring, and the switching circuit includes a first switching circuit and a second switching circuit, the first switching circuit being connected to respective other ends of the first coils and the second coils that are arranged in a first row of the two rows, and the second switching circuit being connected to respective other ends of the first coils and the second coils that are arranged in a second row of the two rows.

BRIEF DESCRIPTION OF THE DRAWINGS

FIG. 6 is a schematic view illustrating the arrangement of and the wiring structure for multiple coils in a second modification of the eddy current flaw detection probe according to the embodiments.

DETAILED DESCRIPTION OF THE PREFERRED EMBODIMENT

The following describes embodiments of an eddy current flaw detection probe according to the present application in detail based on the drawings. The embodiments are not intended to limit this application.

Figure 1:
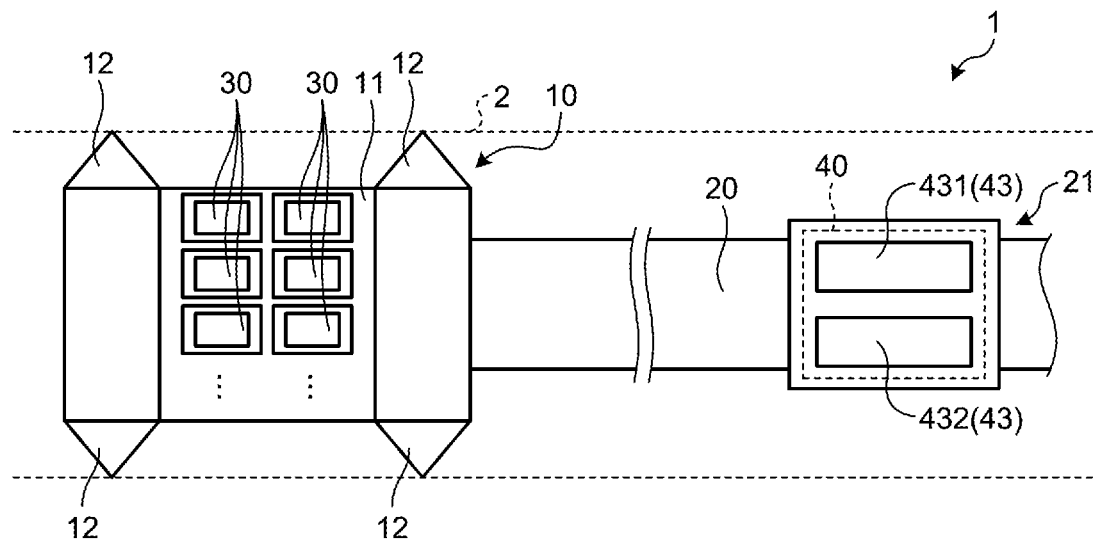
FIG. 1 is a schematic illustration of an eddy current flaw detection probe according to embodiments.

FIG. 1 is a schematic illustration of an eddy current flaw detection probe according to the embodiments. The eddy current flaw detection probe 1 illustrated in FIG. 1 performs a flaw detection inspection on an inspection target by generating eddy currents in the inspection target and detecting a change in the eddy currents. The inspection target is an inside of a pipe 2 such as a steam pipe of a heat exchanger not illustrated that is installed in, for example, a nuclear power generation plant. The eddy current flaw detection probe 1 is configured to perform the flaw detection inspection as needed while being moved by a user along the inside of the pipe 2. However, the eddy current flaw detection probe 1 illustrated in FIG. 1 may be used for the flaw detection inspection on the inside of any pipe that is given as the inspection target.

The eddy current flaw detection probe 1 includes a head part 10, a cylindrical part 20, multiple coils 30, and a control circuit 40 as illustrated in FIG. 1. The head part 10 includes a wound-around part 11 which is formed in a substantially cylindrical shape and in which the coils 30 are wound on an outer circumference thereof. In the following description, an axial direction of the head part 10 is referred to as "the axial direction", and a circumferential direction of the head part 10 is referred to as "the circumferential direction". At both outside ends of the wound-around part 11 in the axial direction, the head part 10 has stabilizers 12 projecting from an outer circumferential surface thereof. The stabilizers 12 are used for centering the head part 10 in the pipe 2 when the eddy current flaw detection probe 1 is inserted into the inside of the pipe 2. Each of the stabilizers 12 may be formed on the entire circumference of the head part 10 or may be composed of multiple portions placed at intervals in the circumferential direction.

Figure 2:
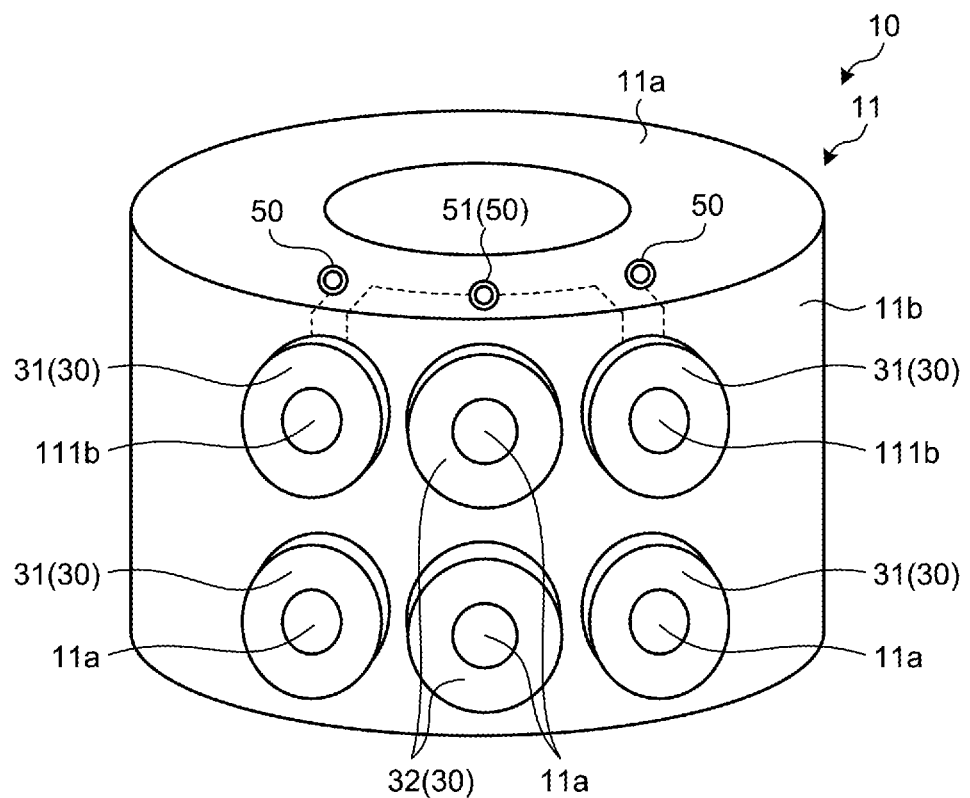
FIG. 2 is a schematic perspective view of a wound-around part.

FIG. 2 is a perspective view schematically illustrating the wound-around part. The wound-around part 11 is formed in a hollow, substantially cylindrical shape as illustrated. The wound-around part 11 has, on a side surface (outer circumferential surface) 11b thereof extending between end surfaces 11a in the axial direction, the coils 30 lined up in two columns that are side by side in the axial direction. In each of the columns, the coils 30 are arranged at intervals along the circumferential direction. Although only three of the coils 30 in each of the columns are illustrated in FIG. 2, the coils 30 are arranged on the entire circumference of the wound-around part 11 in practice. The wound-around part 11 also has multiple protrusions 111b formed at intervals along the circumferential direction, the protrusions 111b protruding radially outward from the side surface 11b. The coils 30 are arranged along the side surface 11b of the wound-around part 11 by being wound around the respective protrusions 111b. The coils 30 wound around the protrusions 111b are connected, as illustrated by broken lines in the drawing, to electrode pads 50 on the end surfaces 11a in the axial direction. In FIG. 2, only some of the electrode pads 50 are illustrated. Some of the electrode pads 50 are connected to the control circuit 40 via wirings 60 (see FIG. 3), and some are connected to each other via the wiring 60. A wiring structure for the multiple wirings 60 is described down below.

The coil 30 may be wound around in a circular columnar shape or in a quadrangular shape. The side surface 11b of the wound-around part 11 may be segmented into multiple arrangement surfaces in which each of the coils 30 is arranged. The coils 30 may be offset between the first column and the second column in a circumferential direction of the wound-around part 11. The wound-around part 11 may have the side surface 11b formed in a tapered shape the diameter of which is increasingly wider radially outward from each of the end surfaces 11a in the axial direction toward a center thereof.

The cylindrical part 20 is a member extending from the head part 10 along the axial direction and is a grip portion that a user grips when the flaw detection inspection is performed. The cylindrical part 20 has, on an intermediate portion thereof, a circuit placement part 21 for arranging the control circuit 40 thereon. The cylindrical part 20 is formed in an internally hollow configuration, and parts of the multiple wirings 60 that are connected to the coils 30 via the electrode pads 50 are routed therein. The parts of the multiple wirings 60 pass through the inside of the cylindrical part 20 and are connected to the control circuit 40.

Figure 3:
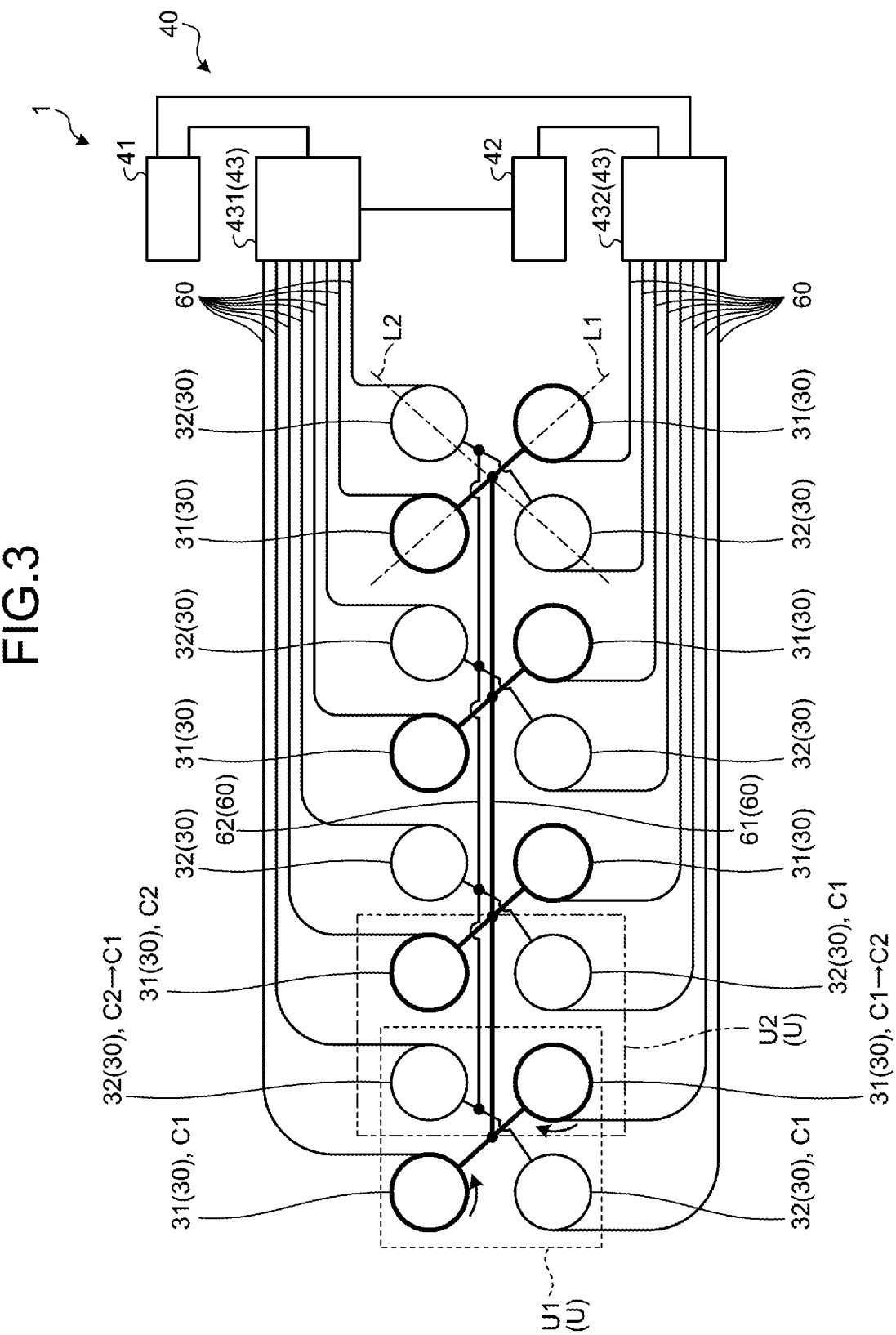
FIG. 3 is a schematic view illustrating an arrangement of and a wiring structure for multiple coils.

The coils 30 are wound around while being arrayed in two rows and two columns along the circumferential direction of the wound-around part 11. FIG. 3 is a schematic view illustrating the arrangement of and the wiring structure for the multiple coils. FIG. 3 schematically illustrates a state in which the multiple coils 30 arranged on the outer circumferential surface of the wound-around part 11 along the circumferential direction thereof are developed on a plane. That is, the leftward or rightward direction illustrated in FIG. 3 corresponds to the above circumferential direction. FIG. 3 illustrates the multiple coils 30 in only eight columns and omits illustration of the electrode pads 50 because FIG. 3 is intended to schematically illustrate the arrangement of the multiple coils 30. The multiple coils 30 include multiple first coils 31 illustrated by bold solid lines in the drawings and multiple second coils 32 illustrated by thin solid lines in the drawings. In the present embodiment, each of the multiple first coils 31 and each of the multiple second coils 32 are coils having the same electromagnetic properties.

The first coils 31 are arranged such that multiple (four in the present embodiment) pairs of the coils 30 arranged in two rows are arranged in a certain direction, that is, the circumferential direction (the leftward or rightward direction in FIG. 3). The second coils 32 are arranged such that multiple (four in the present embodiment) pairs of the coils 30 arranged in two rows are arranged in a certain direction, that is, the circumferential direction (the leftward or rightward direction in FIG. 3). The coils 30 as the second coils in one pair are arranged in a point symmetry in a center line L2 thereof that intersects a center line L1 of the corresponding pair of the coils 30 as the first coils 31. That is, the first coils 31 and the second coils 32 are arranged in an array, and each of the second coils 32 is arranged next to the first coil 31 in each row. Provided that the first coils 31 and the second coils 32 are arranged in an array, the center line L1 and the center line L2 may intersect at any position.

The control circuit 40 includes a transmitter 41, a bridge circuit 42, and switching circuits 43 as illustrated in FIG. 3. The transmitter 41 supplies excitation currents to the coils 30. The bridge circuit 42 detects difference between voltages of the coils 30 that serve as detection coils C2 described below and determines, based on the difference between voltages, whether there is a flaw in the inner side of the pipe given as an inspection target. The switching circuits 43 include a first switching circuit 431 and a second switching circuit 432. The first switching circuit 431 and the second switching circuit 432 are connected to the transmitter 41, the bridge circuit 42, and the multiple coils 30.

The first switching circuit 431 and the second switching circuit 432 are circuits for, by each unit U consisting of adjacent four of the coils 30, causing the first coils 31 or the second coil 32 to serve as excitation coils C1 that generate eddy currents in the pipe 2 and causing the other coils to serve as the detection coils C2 that detect a change in the eddy currents. As exemplified in respective ranges enclosed by a broken line and a chain double-dashed line in FIG. 3, the unit U is a unit composed of the adjacent four coils including two of the first coils 31 and two of the second coils 32 arranged in a point symmetry to the two first coils 31. Known multiplexers, for example, can be used for the first switching circuit 431 and the second switching circuit 432. FIG. 3 illustrates an example in which the first switching circuit 431 and the second switching circuit 432 are each configured as an eight-channel circuit to which eight of the wirings 60 can be connected. The first switching circuit 431 and the second switching circuit 432 at least need to have channels the number of which is sufficient to cover the total number of the wirings 60 that need to be connected thereto and may be provided in plurality in accordance with the required number of channels.

With respect to each unit U, the first switching circuit 431 and the second switching circuit 432 supply an excitation current supplied from the transmitter 41 to the coils which serve as the excitation coils C1 among the first coils 31 and the second coils 32. At the same time, with respect to each unit U, the first switching circuit 431 and the second switching circuit 432 transmit voltages from the other coils which serve as the detection coils C2 among the first coils 31 and the second coils 32 to the bridge circuit 42. For example, when the first coils 31 in a unit U1 (see the range enclosed by the broken line in FIG. 3) are serving as the excitation coils C1, the first coils 31 generate eddy currents illustrated by sold-line arrows in FIG. 3. Consequently, flux linkages are formed in the neighborhood of the inner circumferential surface of the pipe 2. At this time, the flux linkages in opposite directions act on the two detection coils C2 (the second coils 32) in the unit U1. When there is no defect on the inner circumferential surface of the pipe 2, the eddy currents generated by the excitation coils C1 (the first coils 31) are not disrupted, and no difference occurs between the flux linkages acting on the two detection coils C2 (the second coils 32). Thus, there is no difference between voltages detected from the two detection coils C2 (the second coils 32). In contrast, when there is a defect on the inner circumferential surface of the pipe 2, eddy currents generated by the excitation coils C1 (the first coils 31) are disrupted, and a difference occurs between the flux linkages acting on the two detection coils C2 (the second coils 32). Thus, a difference occurs between voltages detected from the two detection coils C2 (the second coils 32). The bridge circuit 42 determines, based on the difference between the voltages detected from the two detection coils C2 (the second coils 32) that have been transmitted from the first switching circuit 431 and the second switching circuit 432, whether there is a defect on the inner circumferential surface of the pipe given as the inspection target.

The first switching circuit 431 and the second switching circuit 432 perform the flaw detection inspection using the unit U1 that precedes other units in a certain direction, that is, the circumferential direction, and then perform the flaw detection inspection using a unit U2 (see the range enclosed by the chain double-dashed line in FIG. 3) arranged one column next to the unit U1. When performing such inspection, the first switching circuit 431 and the second switching circuit 432 use the first coil 31 or the second coil 32 that have been used as the excitation coil C1 in the preceding flaw detection inspection as the detection coil C2 in the succeeding flaw detection inspection. The first switching circuit 431 and the second switching circuit 432 use the first coil 31 or the second coil 32 that have been used as the detection coil C2 in the preceding flaw detection inspection as the excitation coil C1 in the succeeding flaw detection inspection. Thus, as illustrated in FIG. 3, for example, while the two first coils 31 and the two second coils 32 serve as the excitation coils C1 and as the detection coils C2, respectively, in the unit U1, the two first coils 31 and the two second coils 32 serve as the detection coils C2 and as the excitation coils C1, respectively, in the unit U2 one column next to the unit U1. Consequently, the flaw detection inspection can be performed on an overlapping range with respect to each unit U by use of the first coils 31 and the second coils 32 arranged in an array, whereby the precision of the flaw detection inspection can be improved.

Next, the wiring structure for the coils 30 in the eddy current flaw detection probe 1 according to the present embodiment is described. In the present embodiment, the wirings 60 connecting the coils 30 to the first switching circuit 431 and to the second switching circuit 432 include a first common wiring 61 and a second common wiring 62.

Each of the first coils 31 has one end thereof connected to the first common wiring 61 as illustrated in FIG. 3. The first coils 31 are connected to the first common wiring 61 via the electrode pads 50. The first common wiring 61 is routed so that an entirety thereof can be housed in the head part 10. Each of the second coils 32 has one end thereof connected to the second common wiring 62 as illustrated in FIG. 3. The second coils 32 are connected to the second common wiring 62 via the electrode pads 50. The second common wiring 62 is routed so that the entirety thereof can be housed in the head part 10.

The first coils 31 and the second coils 32 have the respective other ends thereof connected to the switching circuits 43 via the wirings 60. In more detail, as illustrated in FIG. 3, the respective other ends of the first coils 31 and the second coils 32 that are arranged in the first row are connected to the first switching circuit 431 via the corresponding wirings 60. As also illustrated in FIG. 3, the respective other ends of the first coils 31 and the second coils 32 that are arranged in the second row are connected to the second switching circuit 432 via the corresponding wirings 60.

In the eddy current flaw detection probe 1 configured in the above-described manner, when the flaw detection inspection is performed using the unit U1, the first switching circuit 431 and the second switching circuit 432 supply the excitation current supplied from the transmitter 41 to the first coils 31 included in the unit U1, for example. When the excitation current is supplied to the first coil 31 in the first row in the unit U1 from the first switching circuit 431 via the wiring 60, the excitation current is conducted through the first coil 31 in the first row and then conducted through the first coils 31 in the second row via the first common wiring 61, for example. Additionally, the first switching circuit 431 and the second switching circuit 432 transmit voltages from the two second coils 32 that are connected via the second common wiring 62 and included in the unit U1 to the bridge circuit 42. The flaw detection inspection using the unit U1 can be thus performed.

Figure 4:
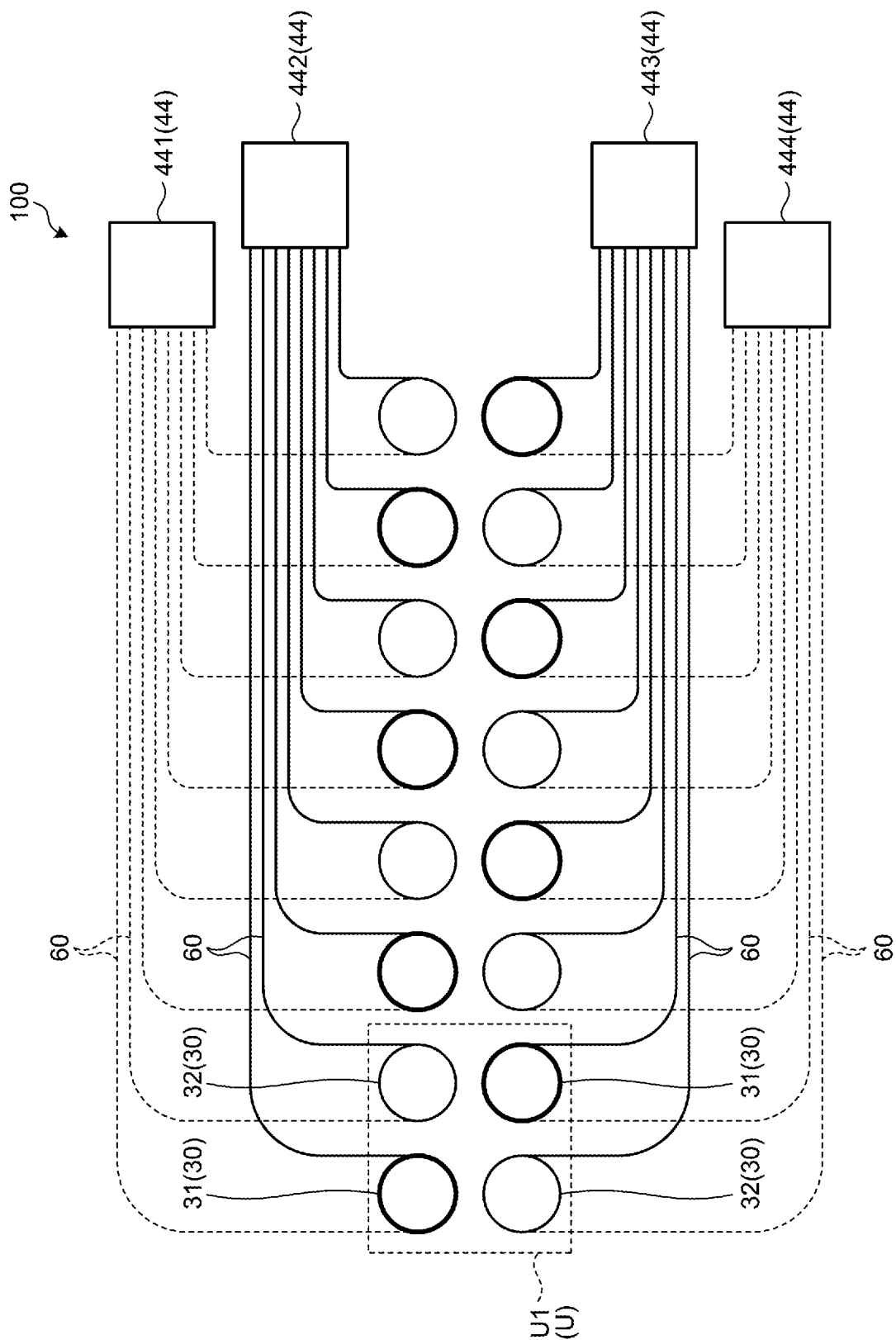
FIG. 4 is a schematic illustration of an arrangement of and a wiring structure for multiple coils in the eddy current flaw detection probe as a comparative example.

Here, FIG. 4 is a schematic illustration of an arrangement of and a wiring structure for coils in an eddy current flaw detection probe as a comparative example. As illustrated, the eddy current flaw detection probe 100 as a comparative example has coils 30 arranged in an array as in the case with the eddy current flaw detection probe 1 according to the embodiments. In the eddy current flaw detection probe 100 as a comparative example, however, the wirings 60 do not include the first common wiring 61 and the second common wiring 62. For this reason, the coils 30 need to be separately connected to the switching circuits 44 in order for the eddy current flaw detection probe 100 to perform the flaw detection inspection using switching circuits 44 that have the same functions as the switching circuits 43 (the first switching circuit 431 and the second switching circuit 432) according to the present embodiment.

In more detail, for example, in order to supply excitation currents to the first coils 31 in the unit U1, a first switching circuit 441 and a second switching circuit 442 for supplying an excitation current to the first coil 31 in the first row are needed, and a third switching circuit 443 and a fourth switching circuit 444 for supplying an excitation current to the first coil 31 in the second row are needed. Likewise, in order to detect voltages from the second coils 32 in the unit U1, the first switching circuit 441 and the second switching circuit 442 for detecting a voltage from the second coil 32 in the first row are needed, and the third switching circuit 443 and the fourth switching circuit 444 for detecting a voltage from the second coil 32 in the second row are needed. In addition, one end and the other end of each of all the coils 30 need to be connected to the corresponding switching circuits 44. In contrast, the eddy current flaw detection probe 1 according to the present embodiment includes the first common wiring 61 and the second common wiring 62 as described above and needs only the other ends of the respective coils 30 to be connected to the corresponding switching circuit 43. The eddy current flaw detection probe 1 can be thus avoided from having a larger size and inferior manufacturability because of an increased number of the wirings and complication of the wiring structure. In addition, the flaw detection inspection can be performed using two switching circuits, that is, the first switching circuit 431 and the second switching circuits 432, whereby the eddy current flaw detection probe 1 can be avoided from having a larger size and inferior manufacturability because of an increased number of switching circuits 43.

As illustrated in FIG. 2, each of the electrode pads 50 that are connected to the first common wiring 61 or the second common wiring 62 can be shared at least in part. For example, as illustrated in FIG. 2, two of the illustrated first coils 31 can share an electrode pad 51 included among the electrode pads 50 and connected to the first common wiring 61. The eddy current flaw detection probe 100 as a comparative example needs two of the electrode pads 50 per each of the coils 30 because both ends of each of the coils 30 are connected to the corresponding switching circuits 44. According to the present embodiment, however, the number of electrode pads 50 can be reduced. Consequently, a space (in the example illustrated in FIG. 2, the end surfaces 11a of the wound-around part 11 in the axial direction) usable in the head part 10 can be larger. Thus, the eddy current flaw detection probe 1 that enables the head part 10 to have a larger usable space may employ, for example, a configuration such as one in which parts of the control circuit 40, such as the first switching circuit 431 and the second switching circuit 432, are arranged on the end surfaces 11a of the wound-around part 11 in the axial direction.

As described above, the eddy current flaw detection probe 1 according to the embodiments enables the one end of each of the first coils 31 to share the first common wiring 61 and enables the one end of each of the second coils 32 to share the second common wiring 62. Therefore, the number of wirings 60 that extend from the respective first coils 31 and the respective second coils 32 to the switching circuits 43 can be smaller than in a configuration in which two wirings extend from each of the coils 30 to switching circuits (the switching circuits 44 in the comparative example). In addition, the switching circuits 43 include the first switching circuit 431 connected to the respective other ends of the first coils 31 and the second coils 32 that are arranged in the first row, and the second switching circuit 432 connected to the respective other ends of the first coils 31 and the second coils 32 that are arranged in the second row. Therefore, the number of switching circuits 43 can be smaller than in a configuration in which two switching circuits (the switching circuits 44 in the comparative example) are included with respect to each row. Thus, according to the eddy current flaw detection probe 1 according to the embodiment, the eddy current flaw detection probe 1 can have a smaller size and be easier to be manufactured.

The eddy current flaw detection probe 1 according to the embodiment further includes the head part 10 of a cylindrical form on which the first coils 31 and the second coils 32 are wound around, and the certain direction is the circumferential direction of the head part 10.

This configuration enables the eddy current flaw detection probe 1 of the cylindrical form to have a smaller size and be easier to be manufactured.

The first common wiring 61 and the second common wiring 62 are housed in the head part 10.

This configuration makes it unnecessary to route the first common wiring 61 and the second common wiring 62 from the head part 10 to positions outside thereof, thereby making it possible to avoid complication of the wiring structure.

Connection between the one end of each of the first coils 31 and the first common wiring 61 and connection between the one end of each of the second coils 32 and the second common wiring 62 are made via the electrode pads 50. Each of these electrode pads 50 is shared by at least some of the first coils 31 or at least some of the second coils 32.

This configuration makes it possible to have a smaller number of the electrode pads 50 that connect the first coils 31 to the first common wiring 61 and a smaller number of the electrode pads 50 that connect the second coils 32 to the second common wiring 62. Consequently, the head part 10 can be made more space-saving.

The head part 10 has the protrusions 111b, around which the first coils 31 and the second coils 32 are wound, formed on the outer circumferential surface thereof.

This configuration enables the first coils 31 and the second coils 32 to be attached all over the head part 10 as even as possible as compared to, for example, a configuration in which the head part 10 is provided with cuts for housing therein the first coils 31 and the second coils 32.

The head part 10 has the stabilizers 12 formed thereon that project from the outer circumferential surface thereof and that center the head part 10 in the pipe given as the inspection target.

This configuration enables the eddy current flaw detection probe 1 of the cylindrical form to be centered inside the inner circumferential surface of the pipe given as the inspection target and thus can enhance the precision of the flaw detection inspection.

While the first coils 31 and the second coils 32 are wound around the corresponding protrusions 111b formed on the outer circumferential surface of the wound-around part 11 in the present embodiment, cuts that can house therein the first coils 31 and the second coils 32 may be formed in the wound-around part 11, so that the first coils 31 and the second coils 32 can be housed in the cuts. The first coils 31 and the second coils 32 are not limited to being provided on the outer circumferential surface of the wound-around part 11 and may be provided on the inner circumferential surface thereof.

The configurations applied to the eddy current flaw detection probe 1 according to the embodiments are not limited to being applied to an eddy current flaw detection probe formed in a cylindrical shape and may be applied to an eddy current flaw detection probe formed in another shape. For example, the configurations according to the present embodiments may be applied to an eddy current flaw detection probe formed in a flat-plate shape. That is, the first coils 31 and the second coils 32 may be arranged in an array on a flat plate. In such a case, the certain direction along which the pairs of the coils 30 each consisting of the first coils 31 or the second coils 32 are arranged is a direction along a surface of the flat plate. This configuration also enables an eddy current flaw detection probe of a flat-plate form to have a smaller size and be easier to be manufactured.

Figure 5:
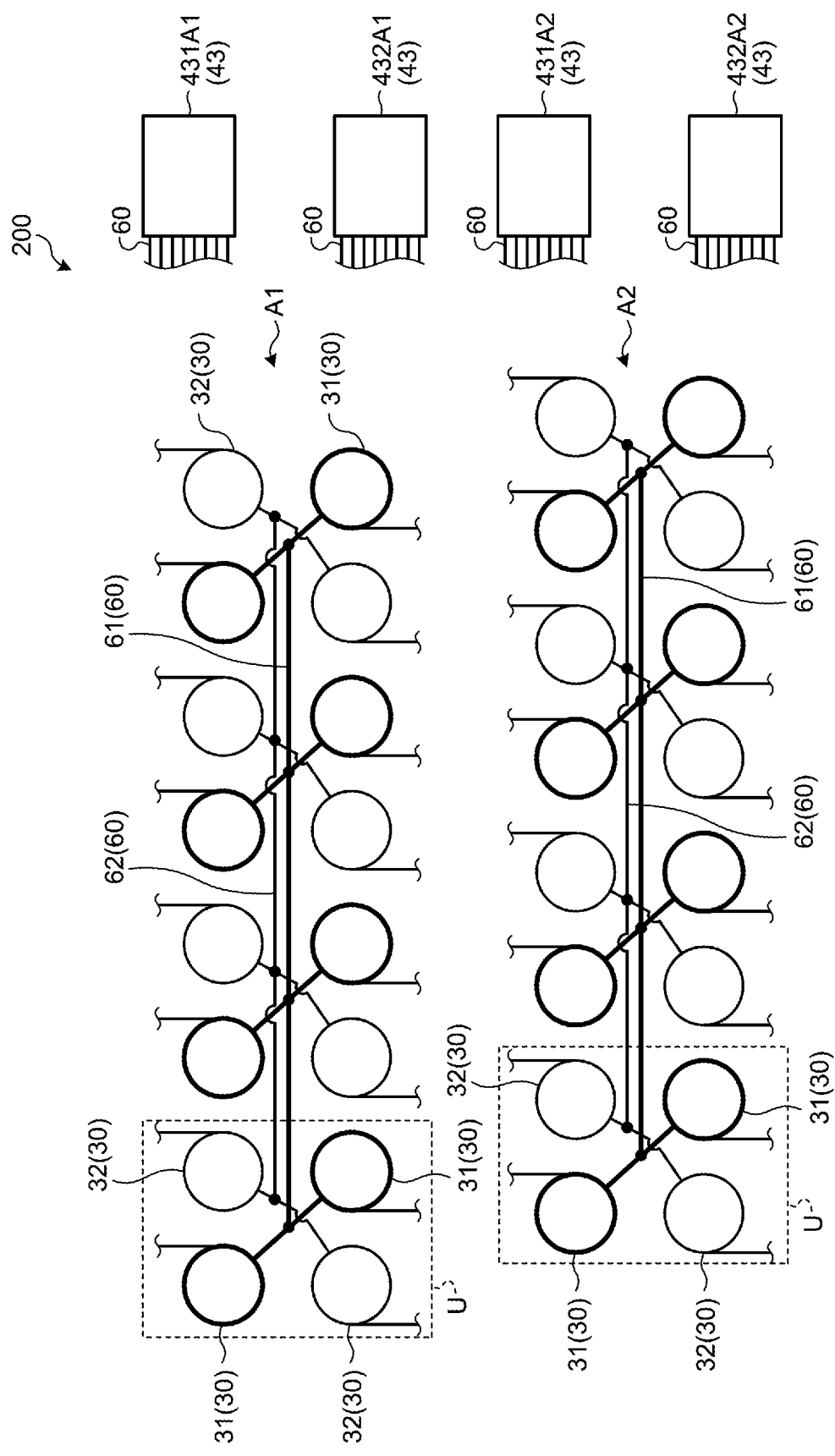
FIG. 5 is a schematic view illustrating the arrangement of and the wiring structure for multiple coils in a first modification of the eddy current flaw detection probe according to the embodiments.

FIG. 5 is a schematic view illustrating the arrangement of and the wiring structure for the multiple coils in a first modification of the eddy current flaw detection probe according to the embodiments. As illustrated in FIG. 5, an eddy current flaw detection probe 200 according to the modification has the first coils 31 and the second coils 32 which are arranged in multiple stages (two stages in the example illustrated in FIG. 5) and lined up in a direction perpendicular to a certain direction (the leftward or rightward direction in FIG. 5).

In the eddy current flaw detection probe 200, one of the first switching circuits 431 and one of the second switching circuits 432 are provided for each of the stages. A structure for the wirings 60 to connect the first coils 31 and the second coils 32 to the first switching circuit 431 and to the second switching circuit 432 in each of the stages is the same as the one illustrated in FIG. 3. In FIG. 5, the respective switching circuits 43 connected to the first coils 31 and to the second coils 32 in the first stage A1 are referred to as a first switching circuit 431A1 and a second switching circuit 432A1, and the respective switching circuits 43 connected to the first coils 31 and the second coils 32 in the second stage A2 are referred to as a first switching circuit 431A2 and a second switching circuit 432A2. A structure for connecting the first coils 31 and the second coils 32 to the first common wiring 61 and to the second common wiring 62 in each of the stages is the same as the one illustrated in FIG. 3.

In the eddy current flaw detection probe 200, as illustrated, the first coils 31 and the second coils 32 are offset between adjacent ones of the stages, that is, between the first stage A1 and the second stage A2, along a certain direction (the leftward or rightward direction in FIG. 5) in the example illustrated in FIG. 5. More specifically, the first coils 31 and the second coils 32 are arranged so as to be staggered between the adjacent stages.

The eddy current flaw detection probe 200 first performs the flaw detection inspection using the first coils 31 and the second coils 32 and the first switching circuit 431A1 and the second switching circuit 432A1 in the first stage A1 illustrated in the upper side of the drawing for each unit U. The same method as the eddy current flaw detection probe 1 described above uses is used. After completing the flaw detection inspection using the first coils 31 and the second coils 32 in the first stage A1, the eddy current flaw detection probe 200 performs, without changing the position thereof, the flaw detection inspection using the first coils 31 and the second coils 32 and the first switching circuit 431A2 and the second switching circuit 432A2 in the second stage A2 illustrated in the lower side of the drawing for each unit U. The same method as the eddy current flaw detection probe 1 described above uses is used. Thus, the eddy current flaw detection probe 200 can use the first coils 31 and the second coils 32 arranged in the stages to perform the flaw detection inspection over a wide range without the eddy current flaw detection probe 200 being moved.

After completing the flaw detection inspection using the second stage A2, a user moves the eddy current flaw detection probe 200 inside the pipe 2 and causes the eddy current flaw detection probe 200 to perform the flaw detection inspection again by following the same procedure. At this time, a range on which the inspection using the first coils 31 and the second coils 32 in the second stage A2 has been performed during the preceding flaw detection inspection is set as a range on which the inspection using the first coils 31 and the second coils 32 in the first stage A1 is performed during the succeeding flaw detection inspection. Thus, the inspection can be performed on an overlapping range in the preceding flaw detection inspection and the succeeding flaw detection inspection, whereby the precision of the flaw detection inspection can be improved. In particular, as described above, the eddy current flaw detection probe 200 has the first coils 31 and the second coils 32 arranged so as to be offset between the first stage A1 and the second stage A2 along the certain direction (the leftward or rightward direction in FIG. 5). Thus, when the inspection is performed on the overlapping range in the preceding flaw detection inspection and in the succeeding flaw detection, the inspection can be performed on different ranges by the corresponding units U in the different stages by the offset between the first stage A1 and the second stage A2. The resolution of the inspection can be thus improved. Consequently, the precision of the flaw detection inspection can be improved.

FIG. 6 is a schematic view illustrating the arrangement of and the wiring structure for the multiple coils in a second modification of the eddy current flaw detection probe according to the embodiment. In the eddy current flaw detection probe 300 according to a second modification. As illustrated in FIG. 6, one end of each of the first coils 31 in all of the stages, that is, in both of the first stage A1 and the second stage A2, is connected to the first common wiring 61. In the eddy current flaw detection probe 300, as illustrated in FIG. 6, one end of each of the second coils 32 in all of the multiple stages, that is, in both of the first stage and the second stage, is connected to the second common wiring 62. The other ends of the first coils 31 and the second coils 32 arranged in the first row in the first stage A1 and in the first row in the second stage A2 are all connected to the same first switching circuit 431. The other ends of the first coils 31 and the second coils 32 arranged in the second row in the first stage A1 and in the second row in the second stage A2 are all connected to the same second switching circuit 432. In the eddy current flaw detection probe 300, each of the first switching circuit 431 and the second switching circuit 432 is a 16-channel circuit. The other configurations of the eddy current flaw detection probe 300 are the same as those of the eddy current flaw detection probe 200, and descriptions thereof are therefore omitted.

In the eddy current flaw detection probe 300, the first common wiring 61 is shared by the first stage A1 and the second stage A2, and the second common wiring 62 is also shared thereby. That is, all of the first coils 31 are connected to each other via the first common wiring 61, and all of the second coils 32 are connected to each other via the second common wiring 62. Thus, when the flaw detection inspection is shifted from the first stage A1 to the second stage A2, the units U can be continuously shifted from one to the next by use of the single first switching circuit 431 and the single second switching circuit 432. Consequently, the first stage A1 and the second stage A2 can share the first switching circuit 431 and the second switching circuit 432, whereby the number of switching circuits 43 can be smaller than in the eddy current flaw detection probe 200 illustrated in FIG. 5. Therefore, the eddy current flaw detection probe 300 can have a smaller size and be easier to be manufactured.

However, in the eddy current flaw detection probe 300, a phase when the first coil 31 and the second coil 32 in the first stage A1 and the first coil 31 and the second coil 32 in the second stage A2 are included in the unit U, as illustrated by a broken line in FIG. 6. In this phase, the first coils 31 and the second coils 32 in the unit U are separately arranged from each other, whereby the flaw detection inspection cannot be performed with the eddy currents being generated. For this reason, a process for not displaying a result of the flaw detection inspection performed by the eddy current flaw detection probe 300 in this phase to a user may be performed, for example.

The configurations illustrated in FIG. 5 and FIG. 6 may be applied to either the eddy current flaw detection probe of the cylindrical form or the eddy current flaw detection probe of the flat-plate form. In each of the eddy current flaw detection probe 200 illustrated in FIG. 5 and the eddy current flaw detection probe 300 illustrated in FIG. 6, the first coils 31 and the second coils 32 do not have to be offset along the certain direction between the adjacent stages.

Although this application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An eddy current flaw detection probe configured to perform a flaw detection inspection on an inspection target by generating eddy currents in the inspection target and detecting a change in the eddy currents, the eddy current flaw detection probe comprising:
    multiple pairs of first coils arranged along a certain direction, the first coils of each pair being arranged in two rows;
    multiple pairs of second coils arranged along the certain direction, the second coils of each pair being arranged in two rows;
    wherein the second coils in one pair are arranged in a point symmetry in a center line therebetween that intersects a center line of a corresponding pair of the first coils; and
    a switching circuit configured to cause the first coils or the second coils in each unit to serve as excitation coils that generate the eddy currents in the inspection target and cause the other coils among the first coils and the second coils in the unit to serve as detection coils that detect a change in the eddy currents, the unit being composed of adjacent four of the coils, the four of the coils being arranged in two rows and two columns and composing two of the first coils and two of the second coils, the two of the second coils being arranged in a point symmetry to the two of the first coils, wherein
    each of the first coils has one end thereof connected to one first common wiring which is common to all of the first coils,
    each of the second coils has one end thereof connected to one second common wiring which is common to all of the second coils, and
    the switching circuit includes a first switching circuit and a second switching circuit, the first switching circuit being connected to respective other ends of the first coils and the second coils that are arranged in a first row of the two rows, and the second switching circuit being connected to respective other ends of the first coils and the second coils that are arranged in a second row of the two rows, and
    wherein the first common wiring and the second common wiring allocate one excitation coil and one detection coil in each of rows in the unit.

2. The eddy current flaw detection probe according to claim 1, further comprising a cylindrical head part on which the first coils and the second coils are wound around, wherein
    the certain direction is a circumferential direction of the head part.

3. The eddy current flaw detection probe according to claim 2, wherein the first common wiring and the second common wiring are entirely housed in the head part.

4. The eddy current flaw detection probe according to claim 3, wherein
    a connection between the one end of each of the first coils and the first common wiring and a connection between the one end of each of the second coils and the second common wiring are made via electrode pads, and
    each of the electrode pads is shared by at least some of the first coils or at least some of the second coils.

5. The eddy current flaw detection probe according to claim 2, wherein the head part has multiple protrusions formed on an outer circumferential surface thereof, around which the first coils and the second coils are wound.

6. The eddy current flaw detection probe according to claim 2, wherein the head part has a stabilizer formed thereon, the stabilizer projecting in a radial direction of the cylindrical head part from the outer circumferential surface thereof and configured to center the head part in the inspection target.

7. The eddy current flaw detection probe according to claim 1, wherein the first coils and the second coils are arranged on a flat plate.

8. The eddy current flaw detection probe according to claim 1, wherein the first coils and the second coils are arranged in multiple stages lined up in a direction perpendicular to the certain direction.

9. The eddy current flaw detection probe according to claim 8, wherein
    each of the first coils in all of the stages has the one end thereof connected to the first common wiring, and
    each of the second coils in all of the stages has the one end thereof connected to the second common wiring.

10. The eddy current flaw detection probe according to claim 8, wherein the first coils and the second coils are arranged in such a manner as to be offset along the certain direction in each of the stages.

* * * * *